Patented June 18, 1929.

1,717,777

UNITED STATES PATENT OFFICE.

THOMAS PERCY HILDITCH, OF GRAPPENHALL, AND HAROLD JOSEPH WHEATON, OF LOWER WALTON, NEAR WARRINGTON, ENGLAND, ASSIGNORS, BY MESNE ASSIGNMENTS, TO AMERICAN DOUCIL COMPANY, OF PHILADELPHIA, PENNSYLVANIA, A CORPORATION OF PENNSYLVANIA.

MANUFACTURE AND PRODUCTION OF BASE-EXCHANGING COMPOUNDS.

No Drawing. Application filed August 13, 1923, Serial No. 657,207, and in Great Britain August 14, 1922.

This invention relates to the production of base-exchanging compounds, or gels, especially applicable to the purification and softening of water, but not necessarily limited thereto.

In the specification of British Letters Patent Nos. 142,974 and 177,746 and under our application No. 657,206, filed August 13, 1923 for United States Letters Patent of even date herewith, we have described and claimed the manufacture and production of base-exchanging compounds, in the case of the first mentioned patent, from a solution of silicate of sodium by treatment with an acid; in the case of the second patent from solutions of sodium silicate and sodium aluminate, observing special conditions and proportions, and in the third case by employing with a solution of sodium or other alkali metal silicate, a solution of an alkali metal salt containing an acid radical capable of combining with additional alkali metal.

We have now found that certain other compounds can be used in conjunction with the sodium silicate solution the said compounds being one, or more, of the following, namely:—sodium chlorate, di-sodium phosphate, sodium sulphate, sodium nitrate and sodium chloride.

The proportion to the sodium silicate of such compound, or compounds, will vary according to the compound, or compounds, employed, say from one molecular proportion of the acidic radical of such added compound, or compounds, to from one molecular proportion, to twelve molecular proportions, of silica.

The concentration of the solutions may be, for instance, from about 15° Twaddell for both the sodium silicate solution and the solution of the added compound, or compounds, but the strength may be considerably varied according to the constituents used, for example, although a convenient strength is the aforesaid 15° Twaddell for each solution when the solubility of the compound permits of that concentration it may be considerably greater provided that the stiff gel resulting from the mixed solutions contains for example between about 5 and 15 (or a little more) per cent of its weight of total solids.

We have examined the action of the specified salts on solutions of different sodium silicates, in which the ratio of silica to sodium oxide has varied from 2.09 to 4.33 of silica to 1 of sodium oxide (moles) and we have not been able to produce gels with any solution in which this ratio was below 3.30 of silica to 1 of sodium oxide and therefore we do not propose to use in this process a silicate of lower ratio than 3.3 of silica to 1 of sodium oxide.

When a silicate whose ratio of silica to sodium oxide lies between 3.3 to 1 and 3.7 to 1 is employed, it is necessary to work with a somewhat concentrated silicate solution, say one of from 40° to 80° Twaddell and with a concentrated solution of the other sodium salt, or salts, employed, for example, a 50 per cent solution of sodium nitrate. With silicates of ratios of 3.7 silica to 1 of sodium oxide upwards, it is practicable to employ more dilute silicate solutions (down to the limit of 15° Twaddell) and also to use more dilute salt solutions, for example solutions of from 5 to 10 per cent concentration.

Although we herein particularly mention sodium salts, it is to be understood that, where it is available, potassium silicate can be used and also that, where they are available, the corresponding potassium, or ammonium, salts may be used to mix with the silicate as aforesaid. As in using these other salts it will be understood that the amount thereof chemically equivalent to the amounts given for the sodium salts will be used it is unnecessary to give examples of the use of these other salts.

The following are examples of how this invention may be carried out in practice, but we do not limit ourselves to the detail of these examples, they being mainly directions for producing gels of the most homogeneous character and do not exclude operating with solutions of other concentrations within the limits of the foregoing general description.

The parts are by weight and the mixing is presumed to be done at atmospheric temperature.

Example 1.

Mix 1,410 parts of a solution of sodium silicate of 45° Twaddell (containing 338 parts of silica and 89 parts of sodium oxide) with 4,000 parts of a solution containing 400 parts of sodium chlorate. The mixture, which thus contains 15 per cent of its weight of total solids, sets in about five minutes to a firm homogeneous gel, which is dried and washed. The drying should be slowly and gently effected in a current of warm air so as to preserve as nearly as possible the physical structure. When the gel becomes hard it is washed in a current of water to remove the soluble salts under which treatment it will break down from lumps into granules.

*Example 2.*

Mix 1,110 parts of a solution of sodium silicate of 55° Twaddell (containing 338 parts of silica and 82 parts of sodium oxide) with 7,140 parts of a solution containing 357 parts of crystallized di-sodium phosphate. The mixture contains 9.4 per cent of its weight of total solids and sets in the course of from two to three days to a gel which is dried and washed as aforesaid.

*Example 3.*

Mix 1,660 parts of a solution of sodium silicate of 40° Twaddell (containing 338 parts of silica and 80 parts of sodium oxide) with 6,200 parts of a solution containing 620 parts of crystallized sodium sulphate. The mixture contains 13.2 per cent of its weight of solids and, in about twelve hours, sets to a gel which is washed and dried as aforesaid.

*Example 4.*

Mix 215 parts of a solution of sodium silicate of 15° Twaddell (containing 16.9 parts of silica and 4.8 parts of sodium oxide) with 310 parts of a solution containing 31 parts of crystallized sodium sulphate. The mixture, which contains about 10 per cent of its weight of solids, sets in about two days to a gel which is, however, of looser texture than that produced according to Example 3.

*Example 5.*

Mix 1,660 parts of the sodium silicate solution mentioned in Example 3 with 4,800 parts of a solution containing 480 parts of sodium nitrate. The mixture contains 13.9 per cent of its weight of total solids and sets to a firm homogeneous gel in the course of a few minutes. The product is washed and dried as aforesaid.

*Example 6.*

Mix 1,955 parts of a sodium silicate solution (containing 338 parts of silica and 81.5 parts of sodium oxide) with 2,000 parts of a solution containing 200 parts of sodium chloride. The mixture contains 15.6 per cent of its weight of total solids and sets, in a few moments, to a firm gel which is then treated as aforesaid.

What we claim is:—

1. The herein described method of manufacturing a base exchanging material which consists in mixing with a solution of an alkali metal silicate, a solution of a neutral alkali metal salt to produce a gel from the entire mass of the mixed solutions, and in drying the gel.

2. The herein described method of manufacturing a base exchanging material which consists in mixing with a solution of an alkali metal silicate, a solution of a neutral alkali metal salt to produce a gel from the entire mass of the mixed solutions, in drying the gel, and in washing the dried product.

3. As a new article of manufacture, a base exchanging material produced from a gel of the whole mass of a mixture of solutions of an alkali metal silicate and a neutral alkali metal salt.

4. As a new article of manufacture, the product of claim 1.

5. As a new article of manufacture, the product of claim 2.

In testimony whereof we have signed our names to this specification.

THOMAS PERCY HILDITCH.
HAROLD JOSEPH WHEATON.